United States Patent
Yokoyama

(10) Patent No.: US 6,377,020 B1
(45) Date of Patent: Apr. 23, 2002

(54) POWER SUPPLY UNIT

(75) Inventor: Nobuaki Yokoyama, Tokyo (JP)

(73) Assignee: General Research of Electronics, Inc., Tokyo (JP)

( * ) Notice: Subject to any disclaimer, the term of this patent is extended or adjusted under 35 U.S.C. 154(b) by 0 days.

(21) Appl. No.: 09/634,419

(22) Filed: Aug. 8, 2000

(30) Foreign Application Priority Data

Sep. 7, 1999 (JP) ............................................. 11-006851

(51) Int. Cl.[7] .............................................. H01M 10/46
(52) U.S. Cl. ........................ 320/106; 320/110; 320/112
(58) Field of Search ................................ 320/106, 110, 320/112, 113; 429/99, 100; D13/103

(56) References Cited

U.S. PATENT DOCUMENTS 5,661,392 A * 8/1997 Imazeki
5,998,962 A * 12/1999 Akiya ......................... 320/106
6,271,644 B1 * 8/2001 Okada et al. ................ 320/112

\* cited by examiner

*Primary Examiner*—Edward H. Tso
(74) *Attorney, Agent, or Firm*—Flynn, Thiel, Boutell & Tanis, P.C.

(57) ABSTRACT

A power supply unit which has charging function enables error charging of a non-charged-type battery to be prevented, which battery is used as a power supply of an electric circuit device. Such the power supply unit is materialized with simple constitution and a low price. The power supply unit in the electric circuit device includes an external power supply connecting power supply jack, a protection circuit, and so forth. A charged-type battery case is provided with a positive electrode terminal of the power supply unit, a positive terminal corresponding to a first and a second negative electrode terminals, and a first and a second negative terminals. While a non-charged-type battery case is only provided with a positive terminal and a first negative terminal. A terminal corresponding to the second terminal is not provided for the non-charged-type battery case. Consequently, when the charged-type battery is employed, the charged-type battery is charged on the occasion of connection of the external battery, while the non-charged-type battery is not charged as the non-charged-type battery is employed, it is capable of preventing failure charging of the non-charged-type battery.

7 Claims, 2 Drawing Sheets

POWER SUPPLY UNIT

FIELD OF THE INVENTION

The present invention relates to a power supply unit. More to particularly, this invention relates to a power supply unit which is improved such that it causes failure charging to be prevented on the occasion of use of non-charged-type battery in electric circuit device. In such the electric circuit device with charging function, the electric circuit device is capable of being received load-dispatching from any of an external power supply, a charged-type battery and/or a non-charged-type battery (dry cell).

DESCRIPTION OF THE PRIOR ART

In general, the electric circuit device such as a portable type radio cassette device, a scanner, and so forth are capable of being received load-dispatching from any one of the external power supply, the charged-type battery, and the non-charged-type battery. However, some of the above-described devices have charging function. When the charged-type battery is mounted on the device as the device is connected to the external power supply, the device causes the charged-type battery to be charged.

However, on that occasion, the non-charged battery is mounted thereon by mistake, trouble occurs such as liquid leakage, damage, or so forth with the result of charging. For that reason, in the conventional manner, the non-charged-type battery is discriminated from the charged-type battery. As the manner for discriminating the non-charged-type battery from the charged-type battery, a switch is used for switching the case of the non-charged-type battery to the case of the charged-type battery.

However, even though two cases are switched according to demand with each other, in this manner, sometimes switching of the switch is forgotten, or so forth, therefore it is imperfect, and cost is required.

SUMMARY OF THE INVENTION

In view of the foregoing, it is an object of the present invention, in order to overcome the above-mentioned problems, to provide a power supply unit capable of preventing failure charging on the occasion of use of the non-charged-type battery described-above.

According to a first aspect of the present invention, in order to achieve the above-mentioned object, there is provided a power supply unit which comprises an electric circuit device including a connecting means for connecting the electric circuit device to an external power supply, a positive electrode terminal connected to a positive side output terminal of the connecting means, a first negative electrode terminal connected to a switch terminal which becomes OFF as the external power supply is connected to the connecting means, and a second negative electrode terminal connected to a negative side output terminal of the connecting means, a non-charged-type battery case including a positive terminal provided corresponding to the positive electrode terminal, and a negative terminal provided corresponding to the first negative electrode terminal, and a charged-type battery case including a positive terminal provided corresponding to the positive electrode terminal, and a first and a second negative terminals provided corresponding to the first and the second negative electrode terminals respectively.

According to a second aspect of the present invention, in the first aspect, there is provided a power supply unit, wherein the connecting means is a power supply jack consisting of a jack-receiver for receiving a connecting connector of the external power supply, and a power supply jack having the positive side output terminal, a switch terminal, and a first, a second, and a third jack terminals which become the negative side output terminal.

According to a third aspect of the present invention, in the first or the second aspect, there is provided a power supply unit, wherein the electric circuit device is provided with an accommodation room for accommodating the non-charged-type battery case or the charged-type battery case, when the non-charged-type battery case is accommodated to be mounted, the positive electrode terminal and the first negative electrode terminal are connected to the positive terminal and the negative terminal of the non-charged-type battery case respectively, while when the charged-type battery case is accommodated to be mounted, the positive electrode terminal and the first and the second negative electrode terminals are connected to the positive terminal and the first and the second negative terminals of the charged-type battery case respectively.

According to a fourth aspect of the present invention, any of the first to the third aspects, there is provided a power supply unit, wherein the electric circuit device is supplied with power from the connecting means and/or the positive electrode terminal.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DESCRIPTION OF THE PREFERRED EMBODIMENTS

Figure 1:
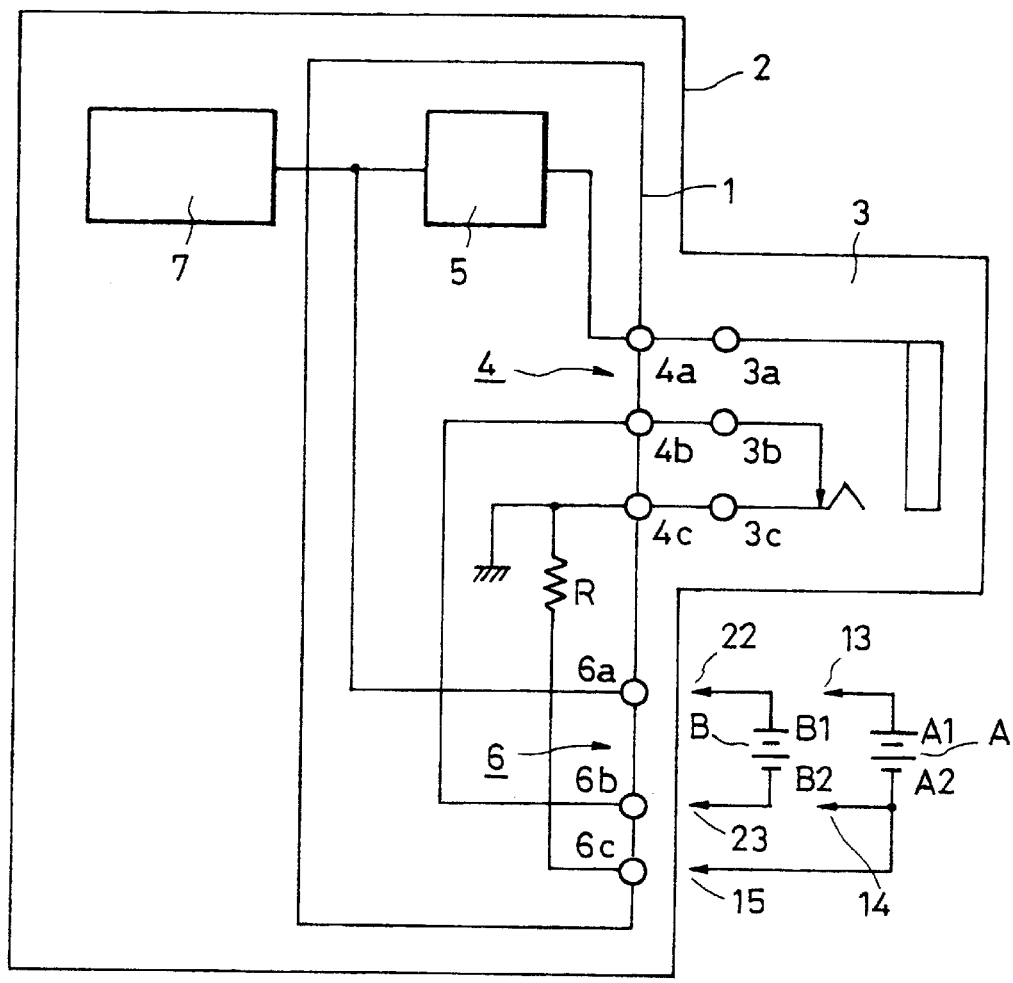
FIG. 1 is a block diagram showing one embodiment of the present invention.

A preferred embodiment of the present invention will now be described in detail in accordance with the accompanying drawings. FIG. 1 is a block diagram showing one embodiment of the power supply unit of the present invention. In FIG. 1, reference numeral 1 is a power supply unit, and 2 is an electric circuit device provided with the power supply unit 1 which is for instance, a portable type radio cassette device, a CD player, a tape recorder, or so forth.

The power supply unit comprises an external power supply connecting power-supply-jack 3, a power supply input terminal 4, a protection circuit 5, and a battery connecting power supply terminal 6. Reference numeral 7 is a prescribed electric circuit 7. The power supply input terminal 4 consists of terminals 4a, 4b, and 4c. The terminal 4a is connected to a positive side output terminal 3a of the power supply jack 3. The terminal 4b is connected to a switch terminal 3b of the power supply jack 3. The terminal 4c is connected to a negative side output terminal 3c of the power supply jack 3. The switch terminal 3b is always connected to the negative output terminal 3c. This connection becomes OFF when a connector is inserted into the power supply jack 3.

An input of the protection circuit 5 is connected to the positive side output terminal 3a of the power supply jack 3 through the power supply input terminal 4a. An output of the protection circuit 5 is connected to a positive electrode terminal 6a of the battery connecting power supply terminal 6. A first negative electrode terminal 6b of the battery connecting power supply terminal 6 is connected to the switch terminal 3b of the power supply jack 3 through the power supply input terminal 4b. A second electrode terminal 6c is grounded through a resistance R, and is connected to the negative side output terminal 3c of the power supply jack 3 through the power supply input terminal 4c.

Figure 2:
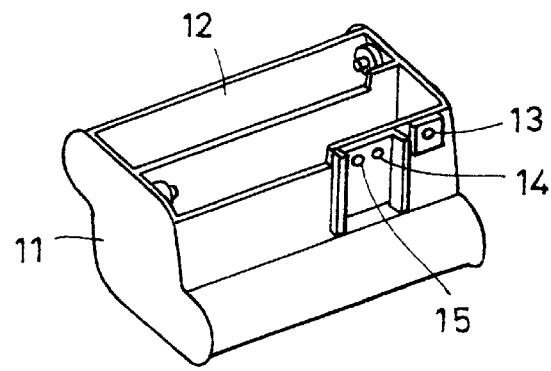
FIG. 2 is a view showing one example of the charged-type battery case used for the present invention.

FIG. 2 shows one example of the charged-type battery case. In FIG. 2, reference numeral 11 is a case body, 12 is a charged-type battery insertion part, 13 is a positive terminal, 14 is a first negative terminal, and 15 is a second negative terminal. The positive terminal 13 is connected with plus (+) side of the inserted battery. The first and the second negative terminals 14, 15 are connected with minus (−) side of the inserted battery.

Figure 3:
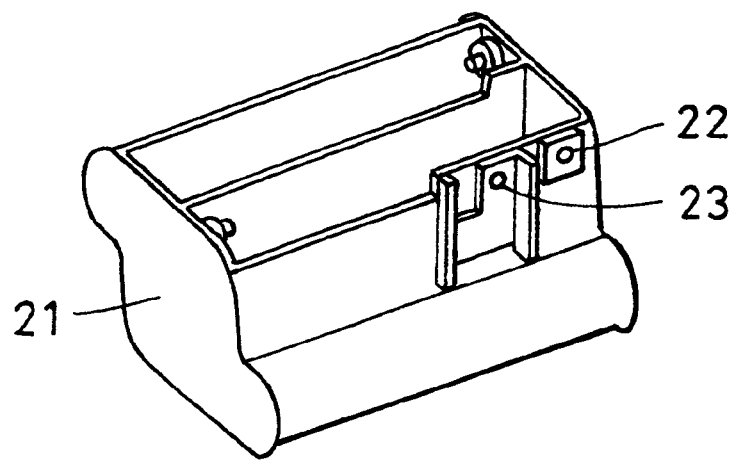
FIG. 3 is a view showing one example of the non-charged-type battery case used for the present invention.

FIG. 3 shows one example of the non-charged-type battery case. In FIG. 3, reference numeral 21 is a case body, 22 is a non-charged-type battery insertion part, 23 is a positive terminal, and 24 is a negative terminal. The positive terminal 23 is connected with plus (+) side of the inserted battery. The negative terminal 24 is connected with minus (−) side of the inserted battery.

Figure 4:
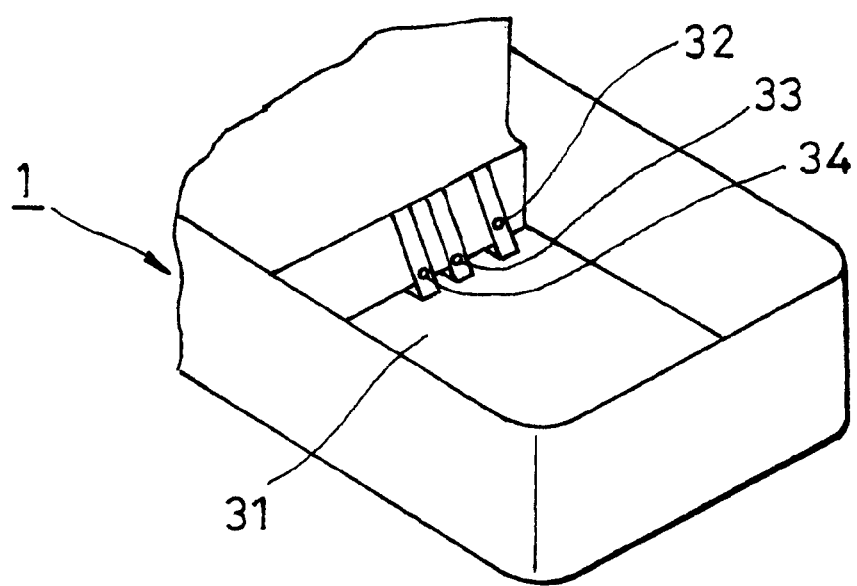
FIG. 4 is a view showing one example of accommodation part of the battery case of the power supply unit 1 used for the present invention.

FIG. 4 shows accommodation part of battery case of the power supply unit 1. In FIG. 4, reference numeral 31 is a battery case accommodation room, 32 to 34 are terminals corresponding to the positive electrode terminal 6a, the first negative electrode terminal 6b, and the second negative electrode terminal 6c respectively.

Then, when the charged-type battery case 11 onto which the charged-type battery is mounted is inserted into the battery case accommodation room 31, the positive terminal 13, the first and the second negative terminals 14, 15 are connected to the terminal 32 (corresponding to the positive electrode terminal 6a), the terminal 33 (corresponding to the first negative electrode terminal 6b), and the terminal 34 (corresponding to the second negative electrode terminal 6c) respectively. In this case, as is clear from FIG. 1, the positive electrode A1 of the charged-type battery A is connected to an output of the protection circuit 5 and to an input of the electric circuit 7. The negative electrode A2 of the charged-type battery A is connected to the switch terminal 3b of the power supply jack through the above-described terminals 14, and 33 (corresponding to the first negative electrode 6b). The negative electrode A2 of the charged-type battery A is connected to the ground and the negative side output terminal 3c through the above-described terminals 15, 34 (corresponding to the second negative electrode 6c), and the resistance R.

Consequently, the power is fed from the charged-type battery A to the electric circuit 7. Under this condition, an external power supply wiring connector (not illustrated) is inserted to be connected to the power supply jack 3. On this occasion, the electric circuit 7 is fed from the external power supply and the switch terminal 3b become OFF, thus the charged-type battery A is charged while flowing charging current from the terminals 34 (corresponding to the second negative electrode 6c), and 13, through the charged-type battery A, the terminals 14, and 33 (corresponding to the first negative electrode 6b). As a result thereof, the charged-type battery A also functions as ordinary power supply and a back-up power supply of the external power supply on the occasion of interruption to service.

To the contrary, the non-charged-type battery case 21 onto which the non-charged-type battery is mounted is inserted into the battery case accommodation room 31, on this occasion, the positive terminal 23 and the first negative terminal 24 are connected to the terminal 32 (corresponding to the positive electrode terminal 6a), and the terminal 33 (corresponding to the first negative electrode terminal 6b) respectively. In this case, as is clear from FIG. 1, the negative electrode B1 of the non-charged-type battery B is connected to the output of the protection circuit 5 and the input of the electric circuit 7. The negative electrode B2 of the non-charged-type battery B is connected to the ground and the negative side output terminal 3c through the above-described terminals 23, 33 (corresponding to the first negative electrode terminal 6b), and through the switch terminal 3b of the power supply jack 3. Consequently, the non-charged-type battery feeds to the electric circuit 7. In this state, when the external power supply wiring connector is inserted to be connected to the power supply jack 3, the switch terminal 3b becomes OFF. Thus, even though the load dispatching is brought to the electric circuit 7 from the external power supply, the non-charged-battery B is not charged.

As described-above, according to the present invention, there is provided the positive electrode terminal and the first negative electrode terminal for the sake of battery connection, and the second negative electrode terminal for the sake of charging within the battery accommodation room of the power supply part of the electric circuit device case, further there is provided the positive terminal, the first and the second negative terminals corresponding to the above-described respective terminals at the charged-type-battery case, however, since the second negative terminal is not provided in the non-charged-type battery case, only when the charged-type battery is mounted on the above-described power supply part, the charging is implemented, so that it is capable of being prevented the failure charging. Addition thereto, in this case, it is not necessary to prepare the switch and so forth for the sake of battery discrimination, but it is suitable to increase the one terminal in every respective places. Thus the present invention is realized with low price and simple constitution.

Furthermore, when it causes the charged-type battery case to be color-coded from the non-charged-type battery case, it has an effect on error-insertion prevention that different battery is inserted into respective battery cases.

While preferred embodiments of the invention have been described using specific terms, the description has been for illustrative purpose only, and it is to be understood that changes and variations may be made without departing from the spirit or scope of the following claims.

What is claimed is:

1. A power supply unit comprising:
   an electric circuit device including a connecting means for connecting said electric circuit device to an external power supply, a positive electrode terminal connected to a positive side output terminal of said connecting means, a first negative electrode terminal connected to a switch terminal which becomes OFF as said external power supply is connected to said connecting means, and a second negative electrode terminal connected to a negative side output terminal of said connecting means;

a non-charged-type battery case including a positive terminal provided corresponding to said positive electrode terminal, and a negative terminal provided corresponding to said first negative electrode terminal; and a charged-type battery case including a positive terminal provided corresponding to said positive electrode terminal, and a first and a second negative terminals provided corresponding to said first and said second negative electrode terminals respectively.

2. A power supply unit as claimed in claim 1, wherein said connecting means comprises a power supply jack consisting of a jack-receiver for receiving a connecting connector of the external power supply, said power supply jack having said positive side output terminal, said switch terminal, and said negative side output terminal as first, second, and third jack terminals.

3. A power supply unit as claimed in claim 1, wherein said electric circuit device is provided with an accommodation room for accommodating said non-charged-type battery case or said charged-type battery case, when said non-charged-type battery case is accommodated to be mounted, said positive electrode terminal and said first negative electrode terminal are connected to said positive terminal and said negative terminal of said non-charged-type battery case respectively, while when said charged-type battery case is accommodated to be mounted, said positive electrode terminal and said first and said second negative electrode terminals are connected to said positive terminal and said first and said second negative terminals of said charged-type battery case respectively.

4. A power supply unit as claimed in claim 2, wherein said electric circuit device is provided with an accommodation room for accommodating said non-charged-type battery case or said charged-type battery case, when said non-charged-type battery case is accommodated to be mounted, said positive electrode terminal and said first negative electrode terminal are connected to said positive terminal and said negative terminal of said non-charged-type battery case respectively, while when said charged-type battery case is accommodated to be mounted, said positive electrode terminal and said first and said second negative electrode terminals are connected to said positive terminal and said first and said second negative terminals of said charged-type battery case respectively.

5. A power supply unit as claimed in claim 1, wherein said electric circuit device is supplied with power from said connecting means and/or said positive electrode terminal.

6. A power supply unit as claimed in claim 2, wherein said electric circuit device is supplied with power from said connecting means and/or said positive electrode terminal.

7. A power supply unit as claimed in claim 3, wherein said electric circuit device is supplied with power from said connecting means and/or said positive electrode terminal.

* * * * *